May 29, 1928.
E. D. TILLYER
1,671,911
SCHEMATIC EYE
Filed Feb. 1, 1926
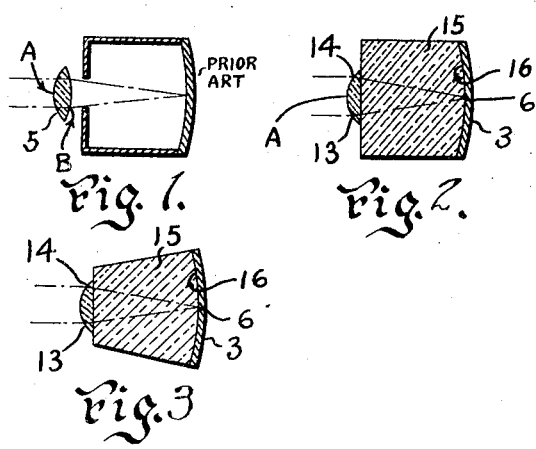
Inventor
Edgar D. Tillyer.
By Harry H. Styll.
Attorney Patented May 29, 1928.

1,671,911

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

SCHEMATIC EYE.

Application filed February 1, 1926. Serial No. 85,248.

This invention relates to improvements in schematic eyes and more particularly to a schematic eye having a continuous medium from the lens to the picture of the fundus.

The principal object of the invention is to provide means to eliminate disturbing reflections from the lens surfaces of the schematic eye which differ from those of the human eye.

Another object of the invention is to provide means that will have practically the same effect on the light rays as the human eye.

Another object of the invention is to eliminate surface reflections from the inner surface of the lens.

Another object of the invention is to provide means for transmitting the light from the lens to the picture of the fundus through a medium that will be practically the same as the human eye in its effect upon the light rays.

Another object of the invention is to provide a continuous light transmitting medium from the lens to the fundus.

Other objects and advantages of the invention should be apparent from the following description taken in connection with the accompanying drawing, in which only the preferred form of the invention has been shown and described by way of illustration. It is apparent that many changes and modifications may be made in the arrangement and construction of the parts and I, therefore, do not wish to be limited to the arrangements and constructions shown as they may be varied without departing from the spirit of the invention as expressed in the claims attached hereto.

Referring to the drawings wherein similar characters designate corresponding parts throughout:

Figure 1 is a diagrammatic representation of the prior art schematic eye.

Figure 2 is a longitudinal cross section through the lens of the invention;

Figure 3 is a view similar to Figure 2 of a modification showing the sides of the lens tapered.

A schematic eye is an instrument which has been used by those professional men who have to make studies of the eye with an ophthalmoscope or retinoscope, that is, an examination of the eye by casting a beam of light therein, where the eye may be examined under light and under magnified conditions if desired. The instrument is merely a practice instrument. It is, therefore, designed to approximate the conditions of the human eye that the examiner is likely to encounter in practice and his reason for using such an instrument is to acquaint himself with the conditions that he is likely to encounter in examining the human eye so that he may become expert in the same and not unduly fatigue his patient by a long or awkward examination through inexperience.

The prior are schematic eye has consisted in the past of a casing having a slide casing to which is secured a picture of the fundus of the eye. In the front of the casing is a lens which represents the lens of the eye. This lens is so positioned that it is supposed to focus near the fundus. If desired an auxiliary lens may be employed, which lens is supported by pin projections. The size of the opening in the eye is regulated by a rotative plate having various sized openings which are adapted to be brought into alignment with the lens by rotation about a pivot, the edges of this rotative plate being knurled to facilitate its action. One casing is slidable in the other casing to obtain the proper focal length.

The instrument has been operated by holding it in one hand and throwing the light from a retinoscope or an ophthalmoscope through the lens to obtain a view of the image of the fundus being moved about in the hand in order to get the proper focus and eliminate shadows, reflections, etc., the idea being to familiarize the operator with the conditions he will meet in examining the human eye, showing him best how to examine the human eye with the greatest facility and in the least space of time as an eye examination is fatiguing and irritating to a patient, who naturally is more or less nervous.

The great objection to the prior art schematic eye is that it is not a fair approximation of the conditions encountered when examining the human eye, because in the schematic eye there is an air space between the lens and the fundus so that there will be surface reflections at A, the front surface of the lens, and also at B, the rear surface of the lens, whereas in the human eye reflections are present only on the front surface, that is, the A reflections. This is due to the fact that the eyeball is all filled in with a medium of nearly the same index of refraction as the lens of the eye, so there are no B reflections of sensible magnitude on the inside, as there is a medium which is almost optically continuous from the surface A of the eye to fundus, where the ray is focused.

It is, therefore, the prime object of my invention to obviate these internal reflections B and to make a lens for my schematic eye that approximates as nearly as humanly possible the conditions that are met in the human eye.

To this end I make my lens as shown in Figure 2. I first make a lens 13 having a front curvature 14 the same curvature as the curvature of the lens of the eye. I make this lens of any refracting material since the reflections will be in the same position if the curvature is the same as that of the eye. I next provide a block or medium 15 having as near as possible the refractive index of the medium of the lens 13, and I secure to the block 15 the lens 13 by cementing with Canada balsam, by optical contact, or otherwise, so that there is practically no change of refractive index at the cemented portion. The block 15 is made so as to have approximately the focal length of the lens 13. The rear surface 16 is made of a curvature optically equivalent to that of the fundus and a picture of the fundus is secured to the surface 16 with an optical contact. The light ray will be focused on the fundus.

In Figure 3, I have shown a similar construction with the exception that the sides of the lens 15 are tapered towards the fundus instead of being made straight as in Figure 2.

It will be seen that in operation the composite lens that I have provided for my schematic eye is the same as that of the normal human eye, there being only the surface A reflections because the distance between the lens 13 and the fundus is filled with a medium which approximates the medium of the lens 13 and there is no inside surface of the lens 13 to give the additional reflections B.

It will be understood that I make a variety or plurality of these devices for a schematic eye each having the focal errors of the eye that is desired to be examined, and having such other characteristics as the examiner desires to test out.

It will also be apparent that the reflections on the human eyeball are very small and that they will be likewise small with my improved construction. It is also apparent that there will be considerable confusion due to the surface reflections of the lens used in the prior art schematic eye, which difficulties are eliminated by my invention. It will, therefore, also be apparent that in examining a schematic eye provided with my invention there will be conditions practically the same as exist in the human eye, which is not the case as set forth above with the prior art schematic eye.

It will also be apparent that instead of making the lens in two pieces, as indicated, it can be made integral and that many different ways of securing the lens if made in two pieces may be followed. I may make or grind my lens 13 having desired eye effects, such as astigmatism, marginal errors, etc., so that I may approximate practically all of the conditions encountered in the human eye by making my lens 13 of the desired eye characteristics and my block 15 to give the desired focal length.

From the foregoing description it will be seen that I have provided simple, efficient and inexpensive means for approximating the conditions of the human eye for all subjects of eye testing and schematic eyes well qualified to carry out all the uses and purposes of the invention as set forth herein.

Having described my invention, I claim:

1. In a device of the character described, a solid transparent member comprising a frontal portion having a curvature corresponding to an eye curvature, a solid central portion of the same index of refraction as the frontal portion, and a terminal portion at the focal length of the frontal portion having a picture of a fundus thereon.

2. In a device of the character described, a solid transparent member comprising a frontal portion having a curvature corresponding to an eye curvature, a central portion of the same index of refraction as the frontal portion, and a terminal portion of a selected curvature located at the focal length of the frontal portion and a picture of a fundus on the terminal portion.

3. In a device of the character described, a block of solid transparent material having one end finished to a curvature corresponding to an eye curvature, and a middle portion of the focal length of the finished end having its other end finished to a curvature corresponding to the curvature of an eye fundus.

4. In a device of the character described, a block of solid transparent material having one end finished to a curvature corresponding to an eye curvature and a middle portion of the focal length of the finished end having its other end finished to a curvature corresponding to a curvature of an eye fundus and a picture of an eye fundus on the last named end.

5. In a device of the character described, a solid transparent member having a frontal curvature corresponding to an eye curvature and having a desired optical defect and having a length equal to the focal length of the frontal curvature and a curvature on its end opposite to the frontal end corresponding to the curvature of an eye fundus.

EDGAR D. TILLYER.